(12) United States Patent
Gao et al.

(10) Patent No.: US 11,535,567 B2
(45) Date of Patent: Dec. 27, 2022

(54) POLYIMIDE-BASED COMPOSITE CARBON FILM WITH HIGH THERMAL CONDUCTIVITY AND PREPARATION METHOD THEREFOR

(71) Applicant: HANGZHOU GAOXI TECHNOLOGY CO., LTD., Hangzhou (CN)

(72) Inventors: Chao Gao, Hangzhou (CN); Yan Guo, Hangzhou (CN)

(73) Assignee: HANGZHOU GAOXI TECHNOLOGY CO., LTD., Hangzhou (CN)

( * ) Notice: Subject to any disclaimer, the term of this patent is extended or adjusted under 35 U.S.C. 154(b) by 462 days.

(21) Appl. No.: 16/617,525

(22) PCT Filed: Feb. 27, 2018

(86) PCT No.: PCT/CN2018/077316
§ 371 (c)(1),
(2) Date: Apr. 24, 2020

(87) PCT Pub. No.: WO2018/219000
PCT Pub. Date: Dec. 6, 2018

(65) Prior Publication Data
US 2020/0277233 A1  Sep. 3, 2020

(30) Foreign Application Priority Data

May 27, 2017 (CN) .......................... 201710391019.7
May 31, 2017 (CN) .......................... 201710398136.6

(51) Int. Cl.
*C04B 35/00* (2006.01)
*B32B 9/00* (2006.01)
(Continued)

(52) U.S. Cl.
CPC .............. *C04B 35/524* (2013.01); *B32B 9/04* (2013.01); *B32B 27/08* (2013.01); *B32B 27/281* (2013.01);
(Continued)

(58) Field of Classification Search
CPC ......... C04B 35/00; C04B 35/50; C04B 35/52; C04B 35/524; C04B 35/60; C04B 35/62;
(Continued)

(56) References Cited

FOREIGN PATENT DOCUMENTS

| CN | 103663444 | * | 3/2014 |
| CN | 103663444 A | | 3/2014 |

(Continued)

OTHER PUBLICATIONS

International Search Report issued in corresponding International application No. PCT/CN2018/077316, dated May 30, 2018.

*Primary Examiner* — Jacob T Minskey
*Assistant Examiner* — Matthew Hoover

(57) ABSTRACT

The present invention discloses a polyimide-based composite carbon film with high thermal conductivity and a preparation method therefor. The preparation method includes: uniformly coating the surface of a polyimide-based carbon film with an aqueous graphene oxide solution, and then covering the same with another polyimide-based carbon film uniformly coated with an aqueous graphene oxide solution; repeating such operation; after the polyimide-based carbon films are dried, bonding the polyimide-based carbon films by means of graphene oxide so as to form a thick film; bonding the polyimide-based carbon films more tightly by means of further low-temperature hot pressing; and finally, obtaining a thick polyimide-based carbon film with high thermal conductivity by repairing defects by means of low-temperature heating pre-reduction and high-temperature and high-pressure thermal treatment. The thick poly-
(Continued)

imide-based carbon film with high thermal conductivity has a thickness greater than 100 μm and an in-plane thermal conductivity of even reaching 1700 W/mK or above.

2 Claims, 1 Drawing Sheet

(51) Int. Cl.
| | |
|---|---|
| B32B 27/00 | (2006.01) |
| B32B 37/00 | (2006.01) |
| B32B 38/00 | (2006.01) |
| C04B 35/524 | (2006.01) |
| B32B 9/04 | (2006.01) |
| B32B 27/08 | (2006.01) |
| B32B 27/28 | (2006.01) |
| B32B 37/02 | (2006.01) |
| B32B 37/10 | (2006.01) |
| C04B 35/626 | (2006.01) |
| C04B 35/645 | (2006.01) |
| B32B 37/06 | (2006.01) |
| B32B 37/24 | (2006.01) |

(52) U.S. Cl.
CPC ............. *B32B 37/02* (2013.01); *B32B 37/06* (2013.01); *B32B 37/1018* (2013.01); *B32B 38/0008* (2013.01); *C04B 35/6264* (2013.01); *C04B 35/62655* (2013.01); *C04B 35/62665* (2013.01); *C04B 35/645* (2013.01); *B32B 2037/243* (2013.01); *B32B 2307/302* (2013.01); *B32B 2309/025* (2013.01); *B32B 2309/125* (2013.01); *B32B 2309/68* (2013.01); *B32B 2310/0472* (2013.01); *B32B 2310/14* (2013.01); *B32B 2313/04* (2013.01); *B32B 2379/08* (2013.01); *C04B 2235/422* (2013.01); *C04B 2235/425* (2013.01); *C04B 2235/48* (2013.01); *C04B 2235/606* (2013.01); *C04B 2235/658* (2013.01); *C04B 2235/6562* (2013.01); *C04B 2235/6567* (2013.01); *C04B 2235/661* (2013.01); *C04B 2235/781* (2013.01); *C04B 2235/9607* (2013.01)

(58) Field of Classification Search
CPC .............. C04B 35/626; C04B 35/6264; C04B 35/6265; C04B 35/62655; C04B 35/6266; C04B 35/62665; C04B 35/64; C04B 35/645; B32B 9/00; B32B 9/04; B32B 27/00; B32B 27/08; B32B 27/20; B32B 27/28; B32B 27/281; B32B 37/00; B32B 37/02; B32B 37/06; B32B 37/10; B32B 37/101; B32B 37/1018; B32B 38/00; B32B 38/0008

See application file for complete search history.

(56) References Cited

FOREIGN PATENT DOCUMENTS

| | | | |
|---|---|---|---|
| CN | 104293308 | * | 1/2015 |
| CN | 104293308 A | | 1/2015 |

* cited by examiner

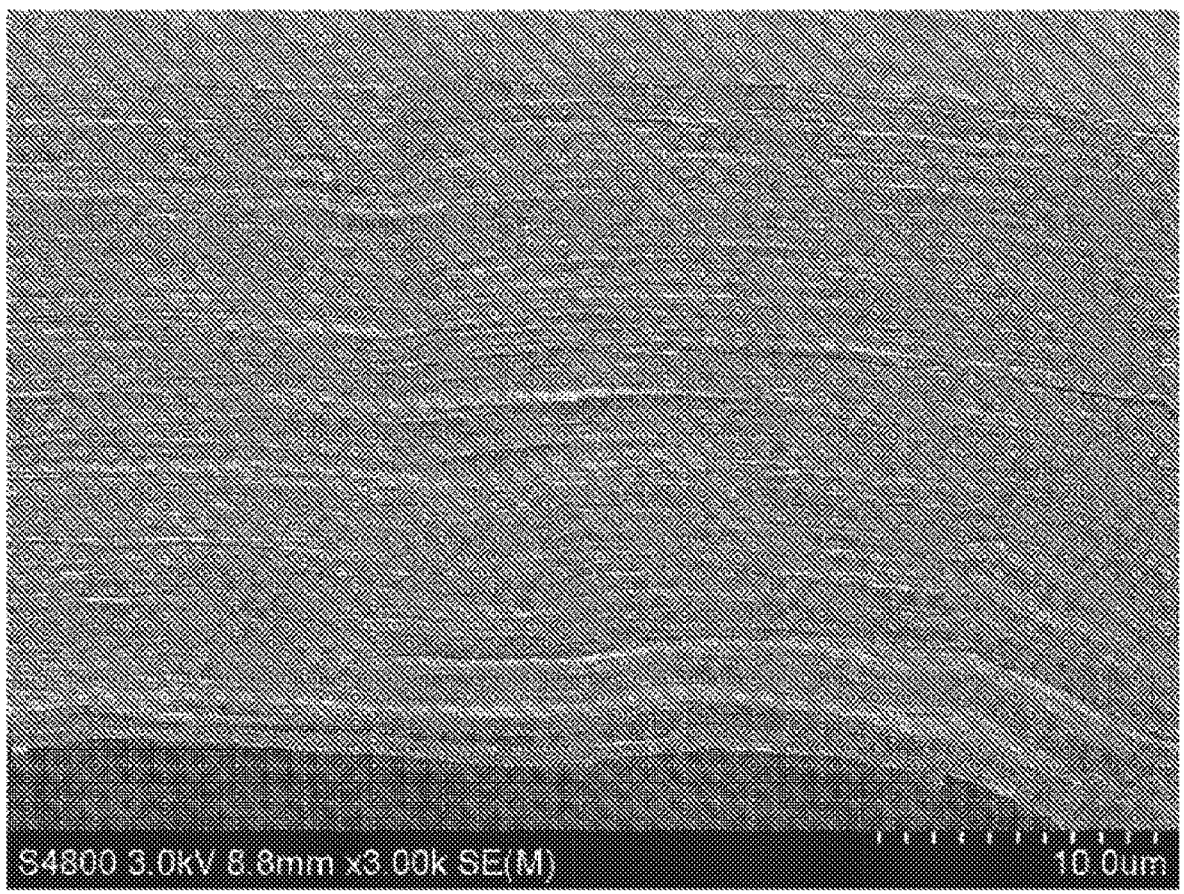

POLYIMIDE-BASED COMPOSITE CARBON FILM WITH HIGH THERMAL CONDUCTIVITY AND PREPARATION METHOD THEREFOR

TECHNICAL FIELD

The present invention relates to a novel thermal conduction material and method, and particularly to a polyimide-based carbon film with relatively large thickness and high thermal conductivity and a graphene/polyimide composite carbon film prepared by using a graphene oxide adhesive.

BACKGROUND

A carbon film has the characteristics of light specific gravity, acid and alkali resistance, organic solvent resistance, good thermal conductivity and electrical conductivity, thermal shock resistance, abrasion resistance, self lubrication property, good machinability and biocompatibility, and large anisotropy. Therefore, the carbon film is widely applied in the fields of space technology, nuclear industry, and electronic information technology.

At present, the carbon film is mainly prepared by employing chemical vapor deposition and a polymer carbonization method. The chemical vapor deposition has the main disadvantage of relatively high cost. Meanwhile, it is necessary for a long period to deposit a relatively thick carbon film, which is technically difficult to achieve. The polymer carbonization method for preparing a carbon film material is a promising method, which is simple in process and less in energy consumption. The prepared carbon film is compact in structure and excellent in mechanical strength. Polyimide, as a synthetic resin with a large number of aromatic heterocyclic structures, is relatively high in carbonization yield and compact in structure, has a good molding process, and may be prepared into complex members such as films, blocks, and profiles. However, at present, there are still problems such as high carbonization temperature, large energy consumption, long carbonization period, relatively low carbonization rate, and relatively large brittleness and frangibility of the prepared carbon film.

However, at present, the carbon film with high thermal conductivity prepared by the polymer carbonization method usually has a thickness ranged from 10 μm to 100 μm. The polyimide-based carbon film or block material having a thickness greater than 100 μm usually has an in-plane thermal conductivity not greater than 800 W/mK due to problems such as severe size shrinkage, excessive internal stress, low carbonization rate, and large or uneven space between graphite sheets in carbonization and graphitization processes.

SUMMARY

An objective of the present invention is to provide a polyimide-based composite carbon film with high thermal conductivity and a preparation method therefor, to overcome the deficiencies of the prior art.

The objective of the present invention is achieved by the following technical solution. A polyimide-based composite carbon film with high thermal conductivity has a thickness greater than 100 μm, with a porosity ranged from 10% to 40% and without a delamination. A space between every two adjacent graphite sheets is less than 20 nm.

Further, the preparation method includes the following steps:

(1) preparing an aqueous graphene oxide solution having a concentration of 1 mg/mL to 10 mg/mL with graphene oxide having an average size greater than 50 μm;

(2) treating a commercial polyimide-based carbon film with an oxygen plasma to make the polyimide-based carbon film hydrophilic, (3) compounding a plurality of polyimide-based carbon films in step 2, that is, uniformly coating surfaces of the polyimide-based carbon films with the graphene oxide solution resulted in step 1, and then bonding the plurality of polyimide-based carbon films together in thickness directions thereof;

(4) drying a bonded polyimide-based composite carbon film resulted in step 3 in an oven, at a temperature lower than or equal to 40° C.;

(5) placing the dried polyimide-based composite carbon film in a hot pressing cavity of a hot pressing machine and thermally treating the dried polyimide-based composite carbon film after a temperature therein has been raised to 200° C. at a rate of 0.1° C./min to 5° C./min, that is, repeating the following hot pressing process for 1 to 5 times: maintaining the pressure at 20 MPa for 1 h; gradually releasing the pressure to 0 MPa, and vacuumizing the hot pressing cavity for 5 min to a vacuum degree ranged from −100 KPa to 10 KPa; then raising the temperature to 300° C. at a rate ranged from 0.1° C./min to 5° C./min, and maintaining the temperature for 0.5 h, and then performing hot pressing; and repeating the following hot pressing process for 1 to 5 times: maintaining the pressure at 60 MPa for 1 h, gradually releasing the pressure to 0 MPa, and vacuumizing the hot pressing cavity for 5 min to a vacuum degree ranged from −100 KPa to 10 KPa; and cooling naturally the polyimide-based composite carbon film after the hot pressing processes are finished; and (6) heating the polyimide-based composite carbon film resulted in step 5 subjected to an inert gas atmosphere to 2400° C. to 3000° C. at a rate ranged from 1° C./min to 20° C./min and further hot pressing the polyimide-based composite carbon film, maintaining the temperature and the pressure of 60 MPa for 0.5 h to 8 h, and cooling and pressing the polyimide-based composite carbon film to obtain the polyimide-based composite carbon film with high thermal conductivity.

There is provided a graphene/polyimide composite carbon film with high thermal conductivity. The prepared graphene/polyimide composite carbon film has a thickness greater than 100 μm, with a porosity ranged from 10% to 40% and an in-plane thermal conductivity ranged from 1000 W/mK to 1700 W/mK and without delamination, wherein a space between every two adjacent graphite sheets is less than 20 nm.

A preparation method for a graphene/polyimide composite carbon film with high thermal conductivity includes the following steps:

(1) preparing an aqueous graphene oxide solution having a concentration of 1 mg/mL to 10 mg/mL with a graphene oxide with an average size greater than 50 μm;

(2) compounding a plurality of polyimide-based carbon films, that is, uniformly coating surfaces of the polyimide-based carbon films with the graphene oxide solution resulted in step 1, and then bonding the plurality of polyimide-based carbon films together in thickness directions thereof;

(3) drying a bonded graphene oxide/polyimide composite carbon film in an oven, at a temperature lower than 40° C.;

(4) placing the dried graphene oxide/polyimide composite film in a carbonization furnace under an argon atmosphere and thermally treating the dried graphene oxide/polyimide composite film after a temperature therein has been raised to 1000° C. at a rate ranged from 0.1° C./min to 5° C./min, maintaining a constant temperature for 1 h every other 100° C., and maintaining a pressure ranged from 20 MPa to 200 MPa during the whole process; and (5) heating the graphene oxide/polyimide composite carbon film resulted in step 5 subjected to an inert gas atmosphere to 2500° C. to 3000° C. at a rate ranged from 1° C./min to 20° C./min and further hot pressing the graphene oxide/polyimide composite carbon film, maintaining the temperature and the pressure of 60 MPa for 0.5 h to 8 h, and cold pressing the graphene oxide/polyimide composite carbon film to obtain the graphene oxide/polyimide composite carbon film with high thermal conductivity.

Further, a carbon to oxide ratio of the graphite oxide used in step 1 is ranged from 1.8 to 2.1.

According to the present invention, after the polyimide-based carbon film is subjected to a hydrophilic treatment, an aqueous graphene oxide solution having a concentration ranged from 1 mg/mL to 10 mg/mL is uniformly sprayed on surfaces of the polyimide-based carbon films; then the plurality of polyimide-based carbon films are bonded together in thickness directions thereof, may be bonded by means of the graphene oxide after being dried, and may be more tightly bonded further by low-temperature hot pressing; and finally, by means of a high-temperature and high-pressure hot pressing treatment method, the graphitization degree of the carbon film is improved, structural defects are repaired, and the orientation degree of the graphite sheet is improved, so that the carbon film forms a three-dimensional graphite structure to the greatest extent, and the smooth conduction of a heat conduction path is ensured. Accordingly, the polyimide-based composite carbon film with high thermal conductivity is obtained.

BRIEF DESCRIPTION OF THE DRAWINGS

FIG. 1 is a SEM sectional view of a polyimide-based composite film prepared by adhesion with an aqueous graphene oxide solution having a concentration of 4 mg/mL.

DESCRIPTION OF THE EMBODIMENTS

The present invention discloses a preparation method for a polyimide composite carbon film with high thermal conductivity by utilizing adhesion properties of graphene oxide. According to the present invention, in order to achieve the adhesion of a polyimide film, after a polyimide-based carbon film is subjected to a hydrophilic treatment, an aqueous graphene oxide solution having a concentration ranged 1 mg/mL to 10 mg/mL is uniformly sprayed on surfaces of the polyimide-based carbon films; then the plurality of polyimide-based carbon films are bonded together in thickness directions thereof, may be bonded by means of graphene oxide after being dried, and may be more tightly bonded further by low-temperature hot pressing; and finally, by means of a high-temperature and high-pressure hot pressing treatment method, the graphitization degree of the carbon film is improved, structural defects are repaired, and the orientation degree of the graphite sheet is improved, so that the carbon film forms a three-dimensional graphite structure to the greatest extent, the smooth conduction of a heat conduction path is ensured. Accordingly, the polyimide-based composite carbon film with high thermal conductivity is obtained. The polyimide-based composite carbon film with high thermal conductivity has a thickness of greater than 100 μm, with a porosity ranged from 10% to 40% and a thermal conductivity ranged from 1000 W/mK to 1700 W/mK, and has the great practical application value.

The present invention further discloses a preparation method for a graphene oxide/polyimide composite carbon film with high thermal conductivity by utilizing adhesion properties of graphene oxide. An aqueous graphene oxide solution is uniformly sprayed on surfaces of the polyimide-based carbon films; then the plurality of polyimide-based carbon films are bonded together in thickness directions thereof, may be bonded by means of graphene oxide after being dried, and may be carbonized further by relatively low temperature hot pressing; and finally, by means of a high-temperature and high-pressure hot pressing treatment method, the plurality of polyimide-based carbon films are graphitized to form a three-dimensional orderly accumulated graphite laminated structure and a relatively complete graphite crystal, so that the smooth conduction of a heat conduction path is ensured. Accordingly, the graphene oxide/polyimide composite carbon film with high thermal conductivity is obtained. The polyimide-based composite carbon film with high thermal conductivity has a thickness greater than 100 μm, with a porosity ranged from 10% to 40% and a thermal conductivity ranged from 1000 W/mK to 1700 W/mK, and has the great practical application value.

The present invention will be further described below with reference to accompanying drawings and embodiments. This embodiment is only used to further describe the present invention, and should not be understood as a limitation on the scope of protection of the present invention. Some nonessential changes and adjustments made by those skilled in the art based on the disclosure of the present invention all fall within the scope of protection of the present invention.

First Embodiment (1) An aqueous graphene oxide solution having a concentration of 4 mg/mL is prepared with graphene oxide having an average size greater than 50 μm.

(2) A commercial polyimide-based carbon film having a thickness of 25 μm is treated with an oxygen plasma to make the polyimide-based carbon film hydrophilic.

(3) Four 10 cm*10 cm polyimide-based carbon films resulted in step 2 are compounded, that is, the surfaces of the polyimide-based carbon films are uniformly coated with the graphene oxide solution resulted in step 1, and then the plurality of polyimide-based carbon films are bonded together in thickness directions thereof.

(4) A bonded polyimide-based composite carbon film is dried in an oven, at a temperature of 40° C.

(5) The dried polyimide-based composite carbon film is placed in a hot pressing cavity of a hot pressing machine and thermally treated after a temperature thereof has been raised to 200° C. at a rate of 0.1° C./min, that is, the following hot pressing process is repeated for 1 time: the pressure is maintained at 20 MPa for 1 h; the pressure is gradually released to 0 MPa, and the hot pressing cavity is vacuumized for 5 min to a vacuum degree of −100 KPa; then the temperature is raised to 300° C. at a rate of 0.1° C./min, and the temperature is maintained for 0.5 h, and then the polyimide-based composite carbon film is hot-pressed; and the following hot pressing process is repeated for 1 time: the pressure is maintained at 60 MPa for 1 h, the pressure is gradually released to 0 MPa, and the hot pressing cavity is vacuumized for 5 min to a vacuum degree of −100 KPa; and the polyimide-based composite carbon film is naturally cooled after the hot pressing processes are finished.

(6) The polyimide-based composite carbon film resulted in step 5 is subjected to an inert gas atmosphere and heated to 2400° C. at a rate of 1° C./min and further hot-pressed, the temperature and the pressure of 60 MPa are maintained for 8 h, and the polyimide-based composite carbon film is cold-pressed to obtain the polyimide-based composite carbon film with high thermal conductivity.

After the above steps are performed, firstly, the polyimide-based carbon film forms an integral structure through an adhesion action of graphene oxide; then defects are repaired by low-temperature hot pressing and high-temperature hot pressing, so that the degree of graphitization is improved; and finally the polyimide-based composite carbon film with high thermal conductivity is obtained. After testing, the original polyimide-based carbon film has a thickness of 25 µm, with a density of 2.01 g/cm$^3$, a porosity of 8.6%, and a thermal conductivity of 1763.2 W/mK. By this time, the polyimide-based composite carbon film has a thickness of 106 µm, with a density of 1.98 g/cm$^3$, a porosity of 10%, and a thermal conductivity of 1702.4 W/mK and without delamination as shown in FIG. 1, wherein a space of every two adjacent graphite sheets is less than 20 nm.

Second Embodiment (1) An aqueous graphene oxide solution having a concentration of 4 mg/mL is prepared with graphene oxide having an average size greater than 50 m.

(2) A commercial polyimide-based carbon film having a thickness of 25 µm is treated with an oxygen plasma to make the polyimide-based carbon film hydrophilic.

(3) Ten 10 cm*10 cm polyimide-based carbon films resulted in step 2 are compounded, that is, the surfaces of the polyimide-based carbon films are uniformly coated with the graphene oxide solution resulted in step 1, and then the plurality of polyimide-based carbon films are bonded together in thickness directions thereof.

(4) A bonded polyimide-based composite carbon film is dried in an oven, at a temperature of 40° C.

(5) The dried polyimide-based composite carbon film is placed in a hot pressing cavity of a hot pressing machine for performing the following treatments.

(5.1) The polyimide-based composite carbon film is hot-pressed after a temperature therein has been raised to 200° C. at a rate of 5° C./min, that is, the following hot pressing process is performed for 5 times: the pressure is maintained at 20 MPa for 1 h; the pressure is gradually released to 0 MPa, and the hot pressing cavity is vacuumized for 5 min to a vacuum degree of 10 KPa.

(5.2) The temperature is raised to 300° C. at a rate of 5° C./min, the temperature is maintained for 0.5 h, and then the polyimide-based composite carbon film is hot-pressed, that is, the following hot pressing process is performed for 5 times: the pressure is maintained at 60 MPa for 1 h, the pressure is gradually released to 0 MPa, and the hot pressing cavity is vacuumized for 5 min to a vacuum degree of 10 KPa.

The polyimide-based composite carbon film is naturally cooled after the hot pressing processes are finished.

(6) The polyimide-based composite carbon film resulted in step 5 is subjected to an inert gas atmosphere and is heated to 3000° C. at a rate of 20° C./min and further hot-pressed, the temperature and the pressure of 60 MPa are maintained for 8 h, and the polyimide-based composite carbon film is cold-pressed to obtain the polyimide-based composite carbon film with high thermal conductivity.

After the above steps are performed, the polyimide-based composite carbon film has a thickness of 2601 m, with a density of 1.88 g/cm$^3$, a porosity of 14.5%, and a thermal conductivity of 1632.5 W/mK and without delamination, wherein a space of every two adjacent graphite sheets is less than 20 nm.

Third Embodiment (1) An aqueous graphene oxide solution having a concentration of 1 mg/mL is prepared with graphene oxide having an average size greater than 50 µm.

(2) A commercial polyimide-based carbon film having a thickness of 25 µm is treated with an oxygen plasma to make the polyimide-based carbon film hydrophilic.

(3) Ten 10 cm*10 cm polyimide-based carbon films resulted in step 2 are compounded, that is, the surfaces of the polyimide-based carbon films are uniformly coated with the graphene oxide solution resulted in step 1, and then the plurality of polyimide-based carbon films are bonded together in thickness directions thereof.

(4) A bonded polyimide-based composite carbon film is dried in an oven, at a temperature of 40° C.

(5) The dried polyimide-based composite carbon film is placed in a hot pressing cavity of a hot pressing machine and thermally treated after a temperature therein has been raised to 200° C. at a rate of 2° C./min, that is, the following hot pressing process is repeated for 5 times: the pressure is maintained at 20 MPa for 1 h; the pressure is gradually released to 0 MPa, and the hot pressing cavity is vacuumized for 5 min to a vacuum degree of −50 KPa; then the temperature is raised to 300° C. at a rate of 2° C./min, and the temperature is maintained for 0.5 h, and then the polyimide-based composite carbon film is hot-pressed; and the following hot pressing process is repeated for 5 times: the pressure is maintained at 60 MPa for 1 h, the pressure is gradually released to 0 MPa, and the hot pressing cavity is vacuumized for 5 min to a vacuum degree of −50 KPa; and the polyimide-based composite carbon film is naturally cooled after the hot pressing processes are finished.

(6) The polyimide-based composite carbon film resulted in step 5 is subjected to an inert gas atmosphere and heated to 2800° C. at a rate of 5° C./min and further hot-pressed, the temperature and the pressure of 60 MPa are maintained for 2 h, and the polyimide-based composite carbon film is cold-pressed to obtain the polyimide-based composite carbon film with high thermal conductivity.

After the above steps are performed, the polyimide-based composite carbon film has a thickness of 258 µm, with a density of 1.85 g/cm$^3$, a porosity of 15.9%, and a thermal conductivity of 1615.2 W/mK and without delamination, wherein a space of every two adjacent graphite sheets is less than 20 nm.

Fourth Embodiment (1) An aqueous graphene oxide solution having a concentration of 10 mg/mL is prepared with graphene oxide having an average size greater than 50 µm.

(2) A commercial polyimide-based carbon film having a thickness of 25 µm is treated with an oxygen plasma to make the polyimide-based carbon film hydrophilic.

(3) Ten 10 cm*10 cm polyimide-based carbon films resulted in step 2 are compounded, that is, the surfaces of the polyimide-based carbon films are uniformly coated with the graphene oxide solution resulted in step 1, and then the plurality of polyimide-based carbon films are bonded together in thickness directions thereof.

(4) A bonded polyimide-based composite carbon film is dried in an oven, at a temperature of 40° C.

(5) The dried polyimide-based composite carbon film is placed in a hot pressing cavity of a hot pressing machine after a temperature therein has been raised to 200° C. at a rate of 2° C./min, that is, the following hot pressing process is repeated for 5 times: the pressure is maintained at 20 MPa for 1 h; the pressure is gradually released to 0 MPa, and the hot pressing cavity is vacuumized for 5 min to a vacuum degree of −50 KPa; then the temperature is raised to 300° C. at a rate of 2° C./min, and the temperature is maintained for 0.5 h, and then the polyimide-based composite carbon film is hot-pressed; and the following hot pressing process is repeated for 5 times: the pressure is maintained at 60 MPa for 1 h, the pressure is gradually released to 0 MPa, and the hot pressing cavity is vacuumized for 5 min to a vacuum degree of −50 KPa; and the polyimide-based composite carbon film is naturally cooled after the hot pressing processes are finished.

(6) The polyimide-based composite carbon film resulted in step 5 is subjected to an inert gas atmosphere and heated to 2800° C. at a rate of 5° C./min and further hot-pressed, the temperature and the pressure of 60 MPa are maintained for 2 h, and the polyimide-based composite carbon film is cold-pressed to obtain the polyimide-based composite carbon film with high thermal conductivity.

After the above steps are performed, the polyimide-based composite carbon film has a thickness of 271 μm, with a density of 1.84 g/cm$^3$, a porosity of 16.4%, and a thermal conductivity of 1595.2 W/mK and without delamination, wherein a space of every two adjacent graphite sheets is less than 20 nm.

Fifth Embodiment (1) An aqueous graphene oxide solution having a concentration of 4 mg/mL is prepared with graphene oxide having an average size greater than 50 μm.

(2) A commercial polyimide-based carbon film having a thickness of 30 m is treated with an oxygen plasma to make the polyimide-based carbon film hydrophilic.

(3) A hundred of 5 cm*5 cm polyimide-based carbon films resulted in step 2 are compounded, that is, the surfaces of the polyimide-based carbon films are uniformly coated with the graphene oxide solution resulted in step 1, and then the plurality of polyimide-based carbon films are bonded together in thickness directions thereof.

(4) A bonded polyimide-based composite carbon film is dried in an oven, at a temperature of 40° C.

(5) The dried polyimide-based composite carbon film is placed in a hot pressing cavity of a hot pressing machine after a temperature therein has been raised to 200° C. at a rate of 2° C./min, that is, the following hot pressing process is repeated for 5 times: the pressure is maintained at 20 MPa for 1 h; the pressure is gradually released to 0 MPa, and the hot pressing cavity is vacuumized for 5 min to a vacuum degree of −50 KPa; then the temperature is raised to 300° C. at a rate of 2° C./min, and the temperature is maintained for 0.5 h, and then the polyimide-based composite carbon film is hot-pressed; and the following hot pressing process is repeated for 5 times: the pressure is maintained at 60 MPa for 1 h, the pressure is gradually released to 0 MPa, and the hot pressing cavity is vacuumized for 5 min to a vacuum degree of −50 KPa; and the polyimide-based composite carbon film is naturally cooled after the hot pressing processes are finished.

(6) The polyimide-based composite carbon film resulted in step 5 is subjected to an inert gas atmosphere and heated to 2800° C. at a rate of 5° C./min and further hot-pressed, the temperature and the pressure of 60 MPa are maintained for 2 h, and the polyimide-based composite carbon film is cold-pressed to obtain the polyimide-based composite carbon film with high thermal conductivity.

After the above steps are performed, firstly, the polyimide-based carbon film forms an integral structure through an adhesion action of graphene oxide; then defects are repaired by low-temperature hot pressing and high-temperature hot pressing, so that the degree of graphitization is improved; and finally a polyimide-based composite carbon film with high thermal conductivity is obtained. After testing, the obtained polyimide-based carbon film has a thickness of 3.17 mm, with a density of 1.54 g/cm3, a porosity of 30%, and a thermal conductivity of 1249.5 W/mK and without delamination, wherein a space of every two adjacent graphite sheets is less than 20 nm.

Sixth Embodiment (1) An aqueous graphene oxide solution having a concentration of 4 mg/mL is prepared with graphene oxide having an average size greater than 50 μm.

(2) Four 100 μm polyimide-based carbon films are compounded, that is, the surfaces of the polyimide-based carbon films are uniformly coated with the graphene oxide solution resulted in step 1, and then the plurality of polyimide-based carbon films are bonded together in thickness directions thereof.

(3) A bonded graphene oxide/polyimide composite carbon film is dried in an oven, at a temperature lower than 40° C.

(4) The dried graphene oxide/polyimide composite film is placed in a carbonization furnace under an argon atmosphere after a temperature therein has been gradually raised to 1000° C. at a rate of 5° C./min, a constant temperature is maintained for 1 h every other 100° C., and a pressure ranged from 20 MPa to 200 MPa is maintained during the whole process.

(5) The graphene oxide/polyimide composite carbon film resulted in step 5 is subjected to an inert gas atmosphere and heated to 2800° C. at a rate of 20° C./min and further hot-pressed, the temperature and the pressure of 60 MPa are maintained for 0.5 h, and the polyimide-based composite carbon film is cold-pressed to obtain the graphene oxide/polyimide composite carbon film with high thermal conductivity.

After the above steps are performed, firstly, the polyimide-based carbon film forms an integral structure through an adhesion action of graphene oxide; then defects are repaired by low-temperature hot pressing and high-temperature hot pressing, so that the degree of graphitization is improved; and finally a polyimide-based composite carbon film with high thermal conductivity is obtained. After testing, the original polyimide-based carbon film has a thickness of 31 μm, with a density of 2.03 g/cm$^3$, a porosity of 7.7%, and a thermal conductivity of 1733.2 W/mK. By this time, the graphene oxide/polyimide composite carbon film has a thickness of 126 μm, with a density of 1.97 g/cm$^3$, a porosity of 10.5%, and a thermal conductivity of 1697.5 W/mK and without delamination, wherein a space of every two adjacent graphite sheets is less than 20 nm.

Seventh Embodiment (1) An aqueous graphene oxide solution having a concentration of 4 mg/mL is prepared with graphene oxide having an average size greater than 50 μm.

(2) Fifty 100 μm polyimide-based carbon films are compounded, that is, the surfaces of the polyimide-based carbon films are uniformly coated with the graphene oxide solution resulted in step 1, and then the plurality of polyimide-based carbon films are bonded together in thickness directions thereof.

(3) A bonded graphene oxide/polyimide composite carbon film is dried in an oven, at a temperature lower than 40° C.

(4) The dried graphene oxide/polyimide composite film is placed in a carbonization furnace under an argon atmosphere after a temperature therein has been gradually raised to 1000° C. at a rate of 2° C./min, a constant temperature is maintained for 1 h every other 100° C., and a pressure of 60 MPa is maintained during the whole process.

(5) The graphene oxide/polyimide composite carbon film resulted in step 5 is subjected to an inert gas atmosphere and heated to 2500° C. at a rate of 5° C./min and further hot-pressed, the temperature and the pressure of 60 MPa are maintained for 0.5 h, and the graphene oxide/polyimide composite carbon film with high thermal conductivity is obtained.

After the above steps are performed, firstly, the polyimide-based carbon film forms an integral structure through an adhesion action of graphene oxide; then defects are repaired by low-temperature hot pressing and high-temperature hot pressing, so that the degree of graphitization is improved; and finally a polyimide-based composite carbon film with high thermal conductivity is obtained. After testing, the graphene oxide/polyimide carbon film has a thickness of 1.76 mm, with a density of 1.82 g/cm$^3$, a porosity of 17.3%, and a thermal conductivity of 1387.3 W/mK and without delamination, wherein a space of every two adjacent graphite sheets is less than 20 nm.

What is claimed is:

1. A preparation method for a polyimide-based composite carbon film with high thermal conductivity, comprising the following steps:

(1) preparing an aqueous graphene oxide solution having a concentration of 1 mg/mL to 10 mg/mL with a graphene oxide having an average size greater than 50 μm;

(2) treating a polyimide-based carbon film with an oxygen plasma to make the polyimide-based carbon film hydrophilic;

(3) compounding a plurality of polyimide-based carbon films resulted in step 2, that is, uniformly coating surfaces of the polyimide-based carbon films with the graphene oxide solution resulted in step 1, and then bonding the plurality of polyimide-based carbon films together in thickness directions thereof;

(4) drying a bonded polyimide-based composite carbon film resulted in step 3 in an oven, at a temperature lower than or equal to 40° C.;

(5) placing the dried polyimide-based composite carbon film in a hot pressing cavity of a hot pressing machine and hot pressing the dried polyimide-based composite carbon film after a temperature therein has been raised to 200° C. at a rate of 0.1° C./min to 5° C./min, which is, repeating the following hot pressing process for 1 to 5 times: maintaining the pressure at 20 MPa for 1 h; releasing the pressure to 0 MPa, and vacuumizing the hot pressing cavity for 5 min to a vacuum degree ranged from −100 KPa to 10 KPa; then raising the temperature to 300° C. at a rate of 0.1° C./min to 5° C./min, and keeping the temperature for 0.5 h, and then hot pressing the polyimide-based composite carbon film; and repeating the following hot pressing process for 1 to 5 times: maintaining the pressure at 60 MPa for 1 h, gradually releasing the pressure to 0 MPa, and vacuumizing the hot pressing cavity for 5 min to a vacuum degree ranged from −100 KPa to 10 KPa; and cooling naturally the polyimide-based composite carbon film after the hot pressing processes are finished; and (6) heating the polyimide-based composite carbon film resulted in step 5 subjected to an inert gas atmosphere to 2400° C. to 3000° C. at a rate of 1° C./min to 20° C./min and further hot pressing the polyimide-based composite carbon film, maintaining the temperature and the pressure of 60 MPa for 0.5 h to 8 h, and cold pressing the polyimide-based composite carbon film to obtain the polyimide-based composite carbon film with high thermal conductivity.

2. The method according to claim 1, wherein a carbon to oxygen ratio of the graphene oxide used in step 1 is ranged from 1.8 to 2.1.

* * * * *